Nov. 4, 1941.     H. EDLER     2,261,675
HIGH TENSION ELECTRICAL MEASURING DEVICE
Filed Feb. 18, 1939
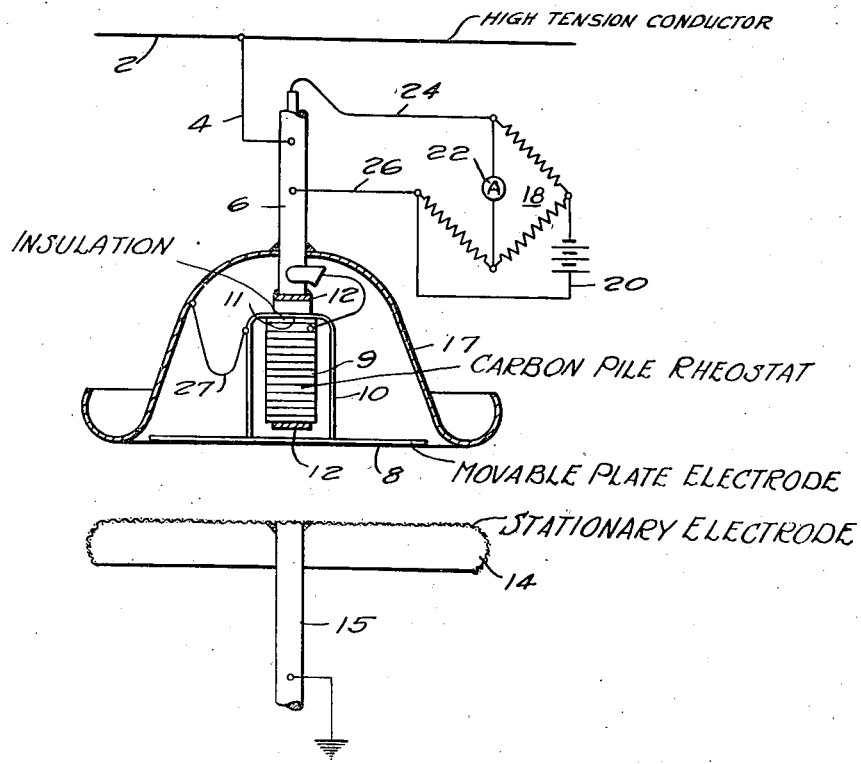
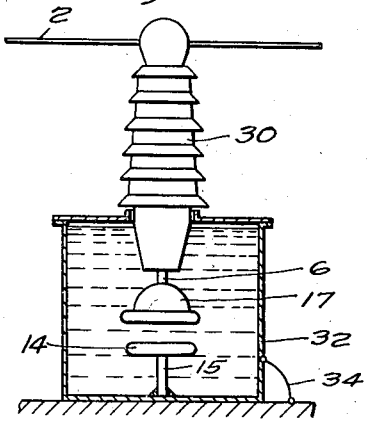
WITNESSES:
INVENTOR
Hans Edler.
BY
ATTORNEY Patented Nov. 4, 1941

2,261,675

UNITED STATES PATENT OFFICE 2,261,675

HIGH-TENSION ELECTRICAL MEASURING DEVICE

Hans Edler, Nuremberg, Germany, assignor to Westinghouse Electric & Manufacturing Company, East Pittsburgh, Pa., a corporation of Pennsylvania Application February 18, 1939, Serial No. 257,168
In Germany May 3, 1938

2 Claims. (Cl. 171—95)

The present invention relates to measuring devices and more particularly to a device for measuring high-tension electrical quantities, such as the voltage of a high-tension direct-current transmission line.

In alternating-current measurements, the voltage to be measured may be reduced by transformers to a reasonably low value by transformers to facilitate measurements with ordinary instruments, and it is relatively simple to insulate the measuring apparatus. In trying to measure high-tension direct current, however, transformation by usual transformers cannot be effected, and the use of rotating machines for converting the direct current to alternating current and then transforming it introduces expense and complications.

It is an object of the present invention to eliminate many of the difficulties in high-tension direct-current measurement and to provide a simple and effective device for accurately measuring quantities proportional to the direct-current voltage to be measured.

Other objects of the invention will appear from the following description when read in conjunction with the accompanying drawing, in which:

Figure 1 is a view, partly in section and partly schematic, of the elements involved in the present invention; and Fig. 2 is a view, partly in section, of a practical application of the measuring system and devices shown in Fig. 1.

Referring to Fig. 1, a high-tension direct-current conductor 2, the voltage of which is to be measured, is electrically connected by a conductor 4 to a hollow support 6 of part of the measuring apparatus.

The measuring apparatus includes a circular conducting plate 8, which has secured to it a central yoke 10 which passes over the top of a stack of carbon discs 9 surmounted by a disc 11 of insulating material, the bottom of the stack being supported by a strap 12 passing around the stack and secured to the support 6. The stack of carbon discs constitutes a carbon-pile rheostat, and obviously any force tending to move the plate 8 will vary the contact between the carbon discs and hence the electrical resistance of the rheostat.

The plate 8 constitutes an electrode upon which is to be impressed the full potential of the line 2, by a circuit to be described, and is to cooperate with a second electrode 14, which may be, as indicated, a circular piece of wire mesh, supported on a standard 15 which is at a known potential, such as ground.

With the apparatus thus far described, when the potential to be measured is impressed upon the plate 8, it will be attracted toward the electrode 14 and, as is well known, the force of attraction will be proportional to the difference in potential between the plate 8 and electrode 14, assuming, as is intended, that the electrode 14 is retained in fixed position.

A bell-shaped cover 17 covers the resistor 9 and depends down around the edges of the plate 8. The lower edge of the bell 17 is out of contact with the plate 8 and constitutes a guard ring to improve the electrical distribution of the charges on the plate and electrode 14. Preferably the edges of the bell and plate are rounded to reduce the possibility of flash-over and further improve the voltage distribution.

A measuring circuit, which has been found to be satisfactory, includes a bridge 18 having two points connected across a battery 20, and the opposite points connected to an indicating instrument 22. It is intended that the resistor 9 shall constitute the fourth leg of the bridge, and to this end the upper disc of the resistor 9 is connected by means of an insulated conductor 24 extending upwardly through the hollow support 6 to the upper terminal of the bridge. The lower disc of the resistor is connected through the strap 12 to the support 6 and conductor 26 to the adjacent terminal of the bridge. The disc 8 is connected to the line 2 through yoke 10 and conductor 27 connected to the bell 17 which is electrically and mechanically connected to the support 6. The conductor 27 also insures that the plate and its guard ring are at the same potential, which is desirable.

After the bridge has been calibrated in any well known manner, the apparatus described will be effective to give an indication on the instrument 22, when the bridge is balanced, of the voltage on the conductor 2. Of course, in some cases, it may be desirable not to use a bridge, but to merely measure the change in resistance of the resistor 9 directly, and this will give an indication of the voltage on the conductor 2.

A practical application of the invention is shown in Fig. 2, wherein the conductor 2 is connected to the terminal of a bushing 30 through which extends the supporting standard 6. Here the lower electrode 14 is supported directly upon the bottom of a tank 32 which is grounded, as indicated at 34, and the bell 17 with the apparatus therein as shown in Fig. 1 is supported above it in spaced relation, as indicated. Preferably the tank 32 is filled with an insulating fluid, such as oil, to decrease the hazards of the installation, and the grounded tank serves as a protection for the operator. In some cases, it may be desirable to mount the indicating instrument itself with the bridge circuit, if used, within the tank 32, so that all high-tension parts will be submerged, and then provide a window in the tank through which the readings may be taken, and insulated handles extending through the tank wall for manipulating the bridge.

By reason of the measuring instrument described, accurate readings may be made of the voltage of high-tension electrical equipment and in a safe manner without resorting to the necessity of reverting to rotating converters and the like with subsequent transformation to obtain potentials which may be measured with reasonable accuracy by instruments of the usual type.

Quite apparently changes may be made in the construction disclosed, and it is intended that no limitation be placed upon the invention except as imposed by the appended claims.

I claim as my invention:

1. A voltage measuring device for high-tension electrical circuits comprising a fixed electrode at a known electrical potential, a second electrode to be mounted in spaced relation with respect to the first and means for impressing a potential to be measured upon said second electrode, means for movably mounting said second electrode comprising a resistance member fixed at one end and subject to a compressive force proportional to the electrostatic attraction between said electrodes, said resistance member having a resistance which varies in accordance with the degree of compression thereof, means for measuring said variation in resistance, a shield member loosely surrounding said second electrode, and means for impressing thereupon the potential to be measured.

2. A voltage measuring device for high-tension electrical circuits comprising a fixed electrode at a known electrical potential, a second electrode to be mounted in spaced relation with respect to the first and means for impressing a potential to be measured upon said second electrode, means for movably mounting said second electrode comprising a resistance member fixed at one end and subject to a compressive force proportional to the electrostatic attraction between said electrodes, said resistance member having a resistance which varies in accordance with the degree of compression thereof, means for measuring said variation in resistance, a shield member loosely surrounding said second electrode, and means for impressing thereupon the potential to be measured, the peripheral edges of said shield and fixed electrode being rounded to reduce electrostatic discharge therefrom.

HANS EDLER.